(12) United States Patent
Dybsetter et al.

(10) Patent No.: US 7,653,314 B2
(45) Date of Patent: *Jan. 26, 2010

(54) OPTICAL TRANSCEIVER WITH CUSTOM LOGGING MECHANISM

(75) Inventors: Gerald L. Dybsetter, Scotts Valley, CA (US); Luke M. Ekkizogloy, San Jose, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 11/468,246

(22) Filed: Aug. 29, 2006

(65) Prior Publication Data

US 2007/0065151 A1    Mar. 22, 2007

Related U.S. Application Data (60) Provisional application No. 60/717,594, filed on Sep. 16, 2005.

(51) Int. Cl.
*H04B 10/00* (2006.01)
*H04B 10/08* (2006.01)

(52) U.S. Cl. .................. 398/135; 398/22; 398/136; 398/137

(58) Field of Classification Search .............. 398/22, 398/135–139, 164
See application file for complete search history.

(56) References Cited

U.S. PATENT DOCUMENTS

| | | | |
|---|---|---|---|
| 4,784,454 A | 11/1988 | Dyott | |
| 5,144,632 A | 9/1992 | Thonn | |
| 5,812,572 A | 9/1998 | King et al. | |
| 6,400,737 B1 | 6/2002 | Broulin et al. | |
| 6,512,617 B1 | 1/2003 | Tanji et al. | |
| 6,590,644 B1 | 7/2003 | Coin et al. | |
| 6,618,425 B1 | 9/2003 | Carlesi et al. | |
| 6,898,702 B1 | 5/2005 | Evans | |
| 7,215,891 B1 * | 5/2007 | Chiang et al. | 398/137 |
| 7,346,764 B2 * | 3/2008 | Moriwaki et al. | 713/1 |
| 2002/0027688 A1 | 3/2002 | Stephenson | |
| 2002/0078403 A1 | 6/2002 | Gullo et al. | |

(Continued)

OTHER PUBLICATIONS

U.S. Appl. No. 10/882,447, filed Jun. 30, 2004, Ekkizogloy et al.

(Continued)

*Primary Examiner*—Dalzid Singh
(74) *Attorney, Agent, or Firm*—Workman Nydegger (57) ABSTRACT

An optical transceiver that custom logs information based on input from a host computing system (hereinafter referred to as a "host"). The optical transceiver receives input from the host concerning which operational information to log; the operational information may include statistical data about system operation, or measured parameters, or any other measurable system characteristic. The input from the host may also specify one or more storage locations corresponding to the identified operational information. If one or more storage locations are specified, the optical transceiver logs the information to the corresponding storage locations, which may be an on-transceiver persistent memory, the memory of the host or any other accessible logging location. Additionally, the input from the host may specify one or more actions to be performed when the identified information is logged. If one or more actions are specified, the optical transceiver performs the specified actions when the information is logged.

18 Claims, 2 Drawing Sheets

U.S. PATENT DOCUMENTS

| | | |
|---|---|---|
| 2002/0097468 A1 | 7/2002 | Mecherle et al. |
| 2002/0143920 A1 | 10/2002 | Dev et al. |
| 2003/0223756 A1 | 12/2003 | Tatum et al. |
| 2004/0022537 A1 | 2/2004 | Mecherle ............... 398/128 |
| 2004/0033079 A1 | 2/2004 | Sheth et al. |
| 2004/0057730 A1 | 3/2004 | Littlejohn et al. |
| 2004/0136719 A1 | 7/2004 | Hidai et al. |
| 2004/0175172 A1 | 9/2004 | Aronson et al. |
| 2004/0183787 A1 | 9/2004 | Geaghan et al. |
| 2005/0017751 A1 | 1/2005 | Gunn et al. |
| 2005/0047778 A1 | 3/2005 | Levinson |
| 2005/0063711 A1 | 3/2005 | Rossi et al. |
| 2005/0078916 A1* | 4/2005 | Hosking ............... 385/88 |
| 2005/0105915 A1 | 5/2005 | Light |
| 2005/0111845 A1 | 5/2005 | Nelson et al. |
| 2005/0282413 A1* | 12/2005 | Israel et al. ............ 439/76.1 |
| 2006/0002707 A1 | 1/2006 | Ekkizogloy ............ 398/135 |
| 2006/0002708 A1 | 1/2006 | Hahin ................... 398/136 |
| 2006/0018664 A1 | 1/2006 | Levinson et al. |
| 2006/0034612 A1 | 2/2006 | Yu et al. |
| 2006/0098699 A1* | 5/2006 | Sanchez ................ 372/26 |

OTHER PUBLICATIONS

U.S. Appl. No. 10/883,208, filed Jun. 30, 2004, Habin et al.
U.S. Appl. No. 10/883,209, filed Jun. 30, 2004, Dybsetter et al.
U.S. Appl. No. 11/220,770, filed Sep. 7, 2005, Ekkizogloy et al.
U.S. Appl. No. 12/015,240, filed Jan. 16, 2008, Ekkizogloy et al.
U.S. Appl. No. 10/883,209, mailed Aug. 5, 2005, Office Action.
U.S. Appl. No. 10/883,209, mailed Mar. 24, 2006, Final Office Action.
U.S. Appl. No. 10/883,209, mailed Apr. 10, 2007, Office Action.
U.S. Appl. No. 10/883,209, mailed Oct. 30, 2007, Office Action.
U.S. Appl. No. 10/883,209, mailed Jun. 9, 2008, Final Office Action.
U.S. Appl. No. 11/220,770, mailed Apr. 16, 2008, Office Action.

* cited by examiner

OPTICAL TRANSCEIVER WITH CUSTOM LOGGING MECHANISM

CROSS-REFERENCE TO RELATED APPLICATIONS

This application claims the benefit of U.S. Provisional Application No. 60/717,594, filed Sep. 16, 2005, which is incorporated herein by reference in its entirety.

BACKGROUND

1. The Field of the Invention

The present invention relates generally to optical transceivers. More specifically, the present invention relates to optical transceivers that may be configured by inputs from a host computing system to perform custom logging of operational information.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

The operation of optical transceiver is susceptible to its operating environment and to its other operational parameters. One obvious example is the laser bias current. If the transmitter bias current drifts upwards or downwards, a variation in the optical intensity generated by the transmitter may be expected. The transmitted optical power and the received optical power are also important operational parameters. The supply voltage level provided to the optical transceiver also affects its performance.

In addition, temperature can change the operating characteristics of the optical transmitter itself. In particular, the wavelength output of a laser may drift from approximately 0.3 nanometers (nm) to approximately 0.6 nm for every one degree Celsius change in temperature. Since lasers generate heat during operation, this can have a significant effect upon the operation of the laser. Wavelength variations can cause crosstalk, where one transmission becomes confused with another. Furthermore, varying wavelengths due to varying laser temperature may cause different fiber attenuations. Accordingly, laser temperature and wavelength have great influence over the proper operation of the optical transceiver.

High temperatures of the optical transceiver itself may cause temporary or even permanent malfunctioning of not just the laser, but the other electronic components within the optical transceiver. Accordingly, the temperature of the optical transceiver as a whole is also important to the operation of the optical transceiver.

In order to provide proper cooling or heating to the optical transceiver and/or laser, Thermo Electric Coolers (TECs) are often employed, particularly in optical transceivers whose performance is highly temperature-dependent. Such TEC coolers heat or cool depending on the direction and magnitude of current applied to the TEC coolers. Accordingly, the TEC current is also an important operational parameter.

These various parameters (e.g., laser bias current, transmit power, receive power, supply voltage, laser wavelength, laser temperature, transceiver temperature, and TEC current, and the like) are thus important to the operation of the optical transceiver. However, after an optical transceiver malfunctions, it is often difficult to diagnose what the problem has been since there is no conventional mechanism for persistently logging important events that may give an indication as to why the transceiver malfunctioned. For example, if an optical transceiver has an upper temperature rating of 85 degrees Celsius, the optical transceiver may malfunction or even permanently break if its temperature reaches 110 degrees Celsius. Yet, after the fact, it may be difficult to discover that the optical transceiver was subjected to improper temperatures.

Therefore, what would be advantageous is a mechanism for logging events that are important to the operation of an optical transceiver so that these events may be later used to understand the conditions under which the optical transceiver operated.

BRIEF SUMMARY

The foregoing problems with the prior state of the art are overcome by the principles of the present invention, which relate to a method for an optical transceiver to be configured to custom log information about its operational parameters based on inputs from a host computing system (hereinafter referred to as a "host") that is communicatively coupled to the optical transceiver. The optical transceiver includes a system memory and at least one processor.

The processor executes microcode in the system memory. The executed microcode causes the optical transceiver to log information based on an input from the host computing system.

One input from the host may be a logging type identification. This identification causes the optical transceiver to identify specific types of operational information to log. The operational information may include operational data such as, for example, the total operational time, a number of times the optical transceiver has been booted, an average operational time between boots, a total number of error conditions encountered, an identification of one or more error conditions encountered, a categorization of the number of error conditions encountered for a plurality of different error types, or the like. The operational information may also include operational measurements along with the time of measurement. The measured items may include a laser wavelength, a laser temperature, a supply voltage, a transceiver temperature, a laser bias current measurement, a Thermo Electric Cooler (TEC) current measurement, a transmit power measurement, a receive power measurement, or the like.

Another input from the host may be a log location identification. This identification causes the optical transceiver to log the operational information to a specific memory location. These memory locations may be an on-transceiver persistent memory, the memory of the host computing system, a remote evaluation center coupled to the optical transceiver over the internet or other network, or any other accessible storage location.

The input from the host computing system may also be an action identification. This identification causes the optical transceiver to perform certain tasks when the operational information is logged. For example, the optical transceiver may perform a self-diagnostics when logging.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The principles of the present invention relate to an optical transceiver that custom logs information based on input from a host computing system (hereinafter referred to simply as a "host"). The optical transceiver receives input from the host concerning which operational information to log; the operational information may include statistical data about system operation, or measured parameters, or any other measurable system characteristic. The input from the host may also specify one or more storage locations corresponding to the identified operational information. If one or more storage locations are specified, the optical transceiver logs the information to the corresponding storage locations, which may be an on-transceiver persistent memory, the memory of the host or any other accessible logging location. Additionally, the input from the host may specify one or more actions to be performed when the identified information is logged. If one or more actions are specified, the optical transceiver performs the specified actions when the information is logged. An example operational optical transceiver environment will first be described. Then, the operation in accordance with the invention will be described with respect to the operational environment.

Figure 1:
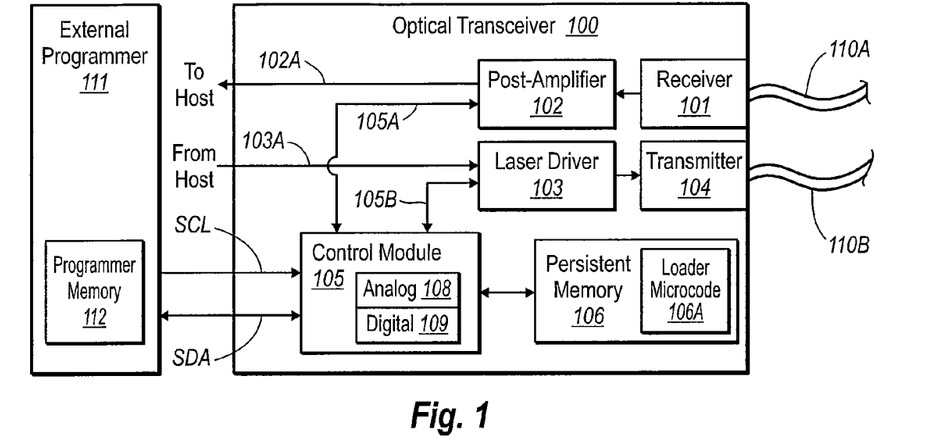
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module

105 may be packaged together in the same package or in different packages without restriction. Persistent memory 106 may also be any other non-volatile memory source.

Figure 2:
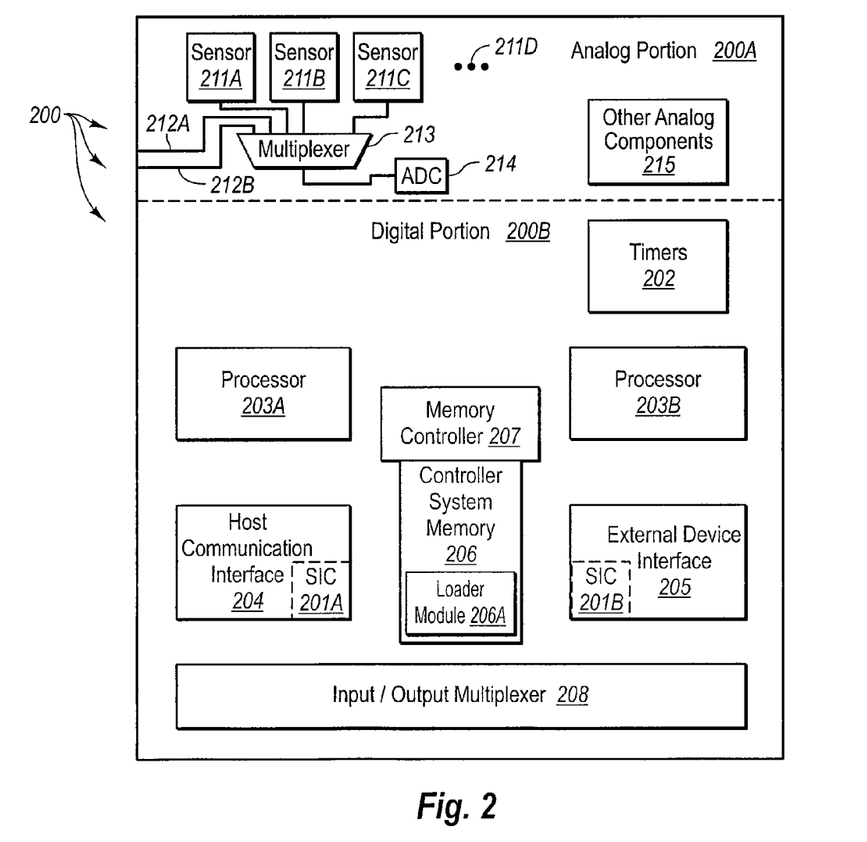
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog, value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment.

Accordingly, the principles of the present invention relate to an optical transceiver that custom logs operational information to possible logging locations and, optionally performs one or more actions upon logging, based on input from a host computing system. Custom logging allows a user to specify which operational information to log, what storage location to log information to, and whether to run actions upon logging. The user sends an input from the host indicating what logging task is desired. The optical transceiver responds to the input by performing the logging task the input specified.

Figure 3:
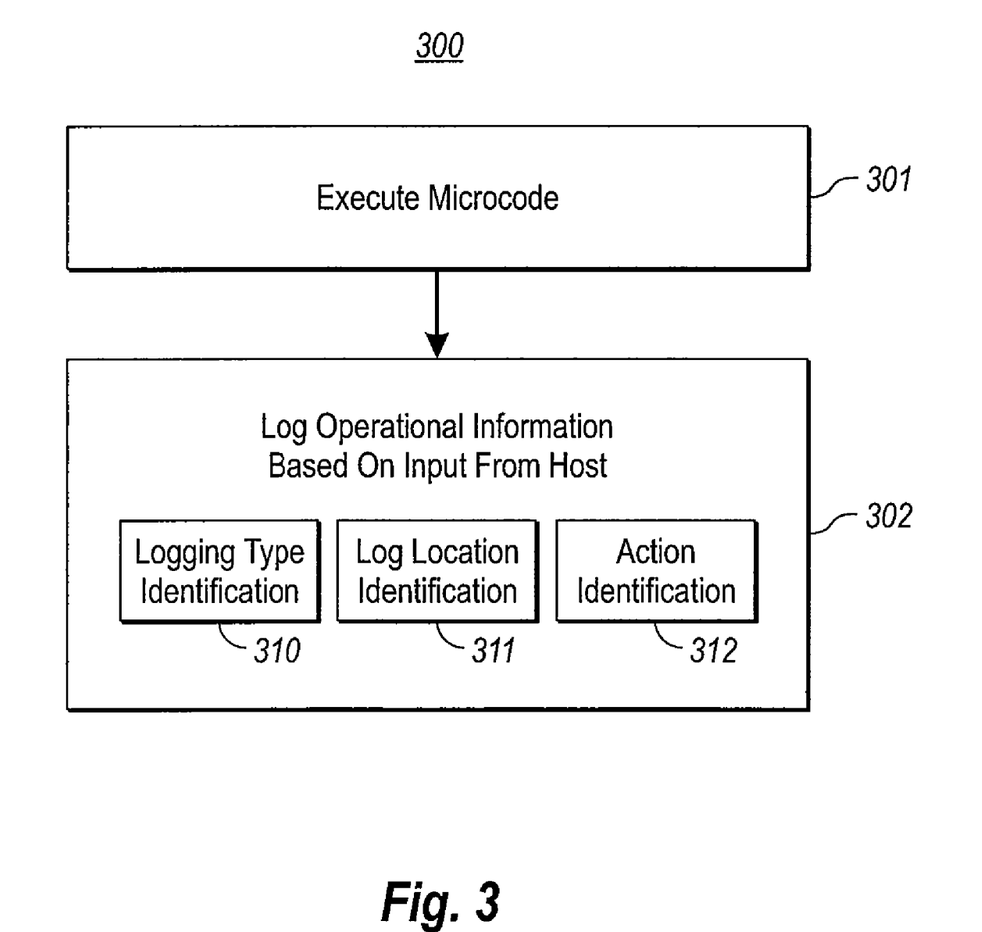
FIG. 3 illustrates a flowchart of a method for an optical transceiver to custom log operational information in accordance with the principles of the present invention.

Referring to FIG. 3, a flowchart of a method 300 for an optical transceiver to custom log operational information is illustrated. This method may be performed by the optical transceiver environment described in relation to FIGS. 1 and 2, or by other environments. First, the optical transceiver executes microcode in the system memory (act 301). This microcode may be loaded into the system memory from the host. Alternatively, it may be loaded from the host into the persistent memory and later loaded into the system memory.

The microcode may contain various inputs from the host that indicate desired logging tasks. For example, the input may be a logging type identification 310 that identifies which operational information to log. For example, a user may desire to only log optical transceiver temperature information or the user may desire to log all operational information. Alternatively, the input may be a log location identification 311 that identifies what storage location to store the logged information. A user may desire to log to one storage location or multiple storage locations. Additionally, the input may also be an action identification 312 that identifies actions that the optical transceiver may take upon logging. The three types of inputs may be included in the microcode by themselves, in different combinations, or all together. For example, a user may desire to log all operational information to two storage locations, but not to perform any actions upon logging. In that case, the microcode would include the logging type identification 310 and the log location identification 311, but not the action identification 312. As will be appreciated, the different combinations of inputs create great flexibility in controlling the various logging tasks.

Referring to FIGS. 1 and 2, optical transceiver 100 executes microcode received from the host. Specifically, processors 203A and 203B load microcode from the host into the controller system memory 206. While controller system memory may be RAM, it may also be a processor, register, flip-flop or other memory device. For example, the processors 203A and 203B may load microcode provided by the external host 111, delivered to control module 105 over the I²C interface or another implemented host interface. For example, external host memory 112 may contain a library of different microcode functions. A user would interface with the external host 111 and choose which microcode function to run based on the desired logging tasks. Alternatively, the processors 203 may load microcode that had been previously sent from the host to persistent memory 106. In addition, external host 111 may be connected to the internet or some other wide area network, allowing processors 203 to acquire microcode from a remote source. This connection can be achieved by any standard internet or wide area network protocol.

Referring again to the method of FIG. 3, the executed microcode causes the optical transceiver to log information regarding its operational circumstances based on input received from the host (act 302). As described above, the inputs identify what logging tasks the optical transceiver will perform.

Referring again to FIGS. 1 and 2, the processors 203 execute the microcode instructions, causing the microcode to form a functional logger in controller system memory 206 or otherwise to form a functional logger. The functional logger has access to the various operational parameters of the optical transceiver for example, from the ADC 214 or from the external lines 212A and 212B.

The logger identifies which optical transceiver parameters to log based on the customized input from the host, which may correspond to logging type identification 310, as described previously. External host 111 may be equipped with a keyboard or other user interface that allows a user to indicate which operational parameters to log. For example, the input from the host may indicate that all operational parameters are to be logged. Alternatively, the input from the host may indicate that only certain operational parameters, for example fluctuations of temperature, are to be logged.

The logger may also be directed to log data based on a processed result, such as the current run time. The logger may also receive instructions providing conditions as to when to log data. For example, if the persistent memory is greater than 40% full, then the log condition may specify that all data is logged, or if the persistent memory is 20% full, then the log condition may specify that a specific operational parameter is logged.

The operational information that may be logged may include statistical information such as, for example, a total operational time, an average operational time between boots, a total number of error conditions encountered, an identification of one or more error conditions encountered, a categorization of the number of error conditions encountered for a plurality of different error types, a number of times the optical transceiver has been booted, or the like. The operational information may also simply record operational parameters measured along with an approximate time of measurement. Such operational parameters may include, for example, a laser wavelength approximation, a laser temperature measurement, a supply voltage measurement, a transceiver temperature measurement, a laser bias current measurement, a Thermo Electric Cooler (TEC) current measurement, a transmit power measurement, a receive power measurement, an acceleration measurement, a peak acceleration measurement, or the like.

In addition to being configured to log certain operational information, optical transceiver 100 may also be configured to store some or all of the logged information in one or more specified logging locations, such as host memory 112, persistent memory 106, or any other accessible logging location, located on or off transceiver 100. As described above, the different storage locations are indicated by the customized input, which may correspond to log location identification 311, received from the host. For example, microcode from host 111 can direct that at least some portion of the recorded data be sent over the SDA and SCL lines, or other implemented host communication interface, to host memory 112 for storage, allowing user access and evaluation of the information. Additionally, if host 111 is connected to the internet or other wide area network, the logged information may be uploaded from host memory 112 to a remote evaluation center using any standard internet or network protocol. In that case, if an optical transceiver failure were to occur, the various log entries could be evaluated to identify possible causes for the failure. For example, if an event was recorded indicating that the optical transceiver experienced a peak acceleration exceeding 20 times the acceleration imposed by gravity (often referred to as "G's"), then one might infer that the optical transceiver had been dropped.

In another embodiment, optical transceiver 100 may be configured to send at least some portion of the recorded data to transceiver persistent memory 106. If the persistent memory 106 was a separate module such as, for example, an EEPROM module, the persistent memory 106 could be unplugged from the optical transceiver 100 to evaluate its memory contents. Alternatively, the persistent memory 106 could be evaluated without removal from the optical transceiver if the optical transceiver has an external I/O interface that allows the persistent memory 106 to be read.

In yet another embodiment, optical transceiver 100 may be configured to send all the logged data to both host memory 112 and to transceiver persistent memory 106. This would allow retrieval and evaluation of the stored data from either memory source and would create a backup should one of the memory sources become disabled. It may also be possible to configure control module 105 to send all the logged data to host memory 112 and a portion to persistent memory 106. For example, persistent memory 106 could be used to permanently store diagnostic information about optical transceiver 100. This would allow analysis of possible causes of optical transceiver failure should external host 111 become separated from optical transceiver 100. As can be appreciated, there are many combinations of logging locations that could be used and the examples given are by no means exclusive.

In addition to identifying operational information to log and where to log the information, optical transceiver 100 may also be configured to perform one or more specified actions when the identified information is logged based on input from the host that may correspond to action identification 312. For example, microcode from host 111 can direct that when certain information is logged, the control module 105 perform a self-test diagnostic routine specific to the type of information that was logged. For instance, if an anomalous laser temperature is detected, the laser temperature could be logged and a self-test diagnostic of the corresponding laser could be performed. Thus, the cause of any corresponding error or anomaly could be determined.

Control module 105 may also be configured to generate a status report or indication upon the completion of a particular logging operation that may be polled by the host 111, allowing user access and evaluation of the information. This would give the host 111 a window on the operation of optical transceiver 100.

Another example of an action that could be performed is "microcode segment paging." "Microcode segment paging" is defined as the act of transferring microcode segments back and forth between the external host and the transceiver as circumstances warrant.

When a particular logging event occurs, host 111 may be directed to page in the microcode segment in response to the logging event. For example, if the self-test diagnostic routine mentioned above is too large to reside in controller system memory 206 or persistent memory 106, host 111 can be directed when certain information is logged to send the microcode segment that will perform the self-test diagnostic to control module 105 over the SDA and SCL lines or other host communication interface. Control module 105 can then execute the microcode received from host 111.

Specifically, processors 203 load microcode from host 111 into the controller system memory 206. Alternatively, the processors 203 may load microcode stored in persistent memory 106 into controller system memory 206 if host 111 sent the microcode to persistent memory 106 originally. The processors 203 execute the microcode, causing the transceiver 100 to perform the designated diagnostics.

Once the microcode has been executed, controller system memory 206 may send the microcode back to host memory 112 if circumstances warrant. For example, keeping the self-test diagnostic routine in controller system memory 206 or persistent memory 106 after the routine has been run would be a waste of precious transceiver 100 memory, especially if the routine is only run when a particular error occurs. The transceiver 100 may be configured to recognize the end of the self-test diagnostic process. On recognizing the end of the process, controller system memory 206 could send the microcode over the $I^2C$ interface or other implemented host interface to host memory 112. Alternatively, host 111 may be configured to send the microcode to host memory 112. This process would also apply to other microcode as well.

A specific embodiment of the present invention will be described with reference to the environment described in FIGS. 1 and 2. Suppose that controller system memory 206 was executing microcode that was structured to implement transceiver operational functions at an operating temperature between 70° C. and 80° C. Using the current invention, a logging type identification could be specified on the host computer 111 to begin logging operating temperature information when the operating temperature falls below 70° C. Along with this specific logging type identification, a storage location could be identified, such as a particular memory location in persistent memory 106. An action to execute, such as performing a self-test of the temperature controllers could also be specified via host computer 111 corresponding to the logging event. This information could then be inputted by the optical transceiver 100.

As mentioned previously, control module analog portion 200A contains sensors 211, one of which may be a temperature sensor. Suppose that the operating temperature falls below 70° C. The temperature sensor would detect this and sensor 211 would send an analog signal of the temperature through multiplexer 213 to ADC 214. ADC 214 would convert the analog signal to a digital signal and send it to the processors 203.

Based on the digitized input from the sensors, the processors 203 would determine that the operational temperature had fallen below 70° C. and cause the controller 207 to continue receiving operational temperature information via sensor 211 and log the operational temperature, storing it in persistent memory beginning at the location downloaded from the host computer 111. If the self-test action had been specified, processors 203 would also execute the code to perform the self-test routine. When the self-test routine was completed, host computer 111 could then obtain this information from the processors 203 over the $I^2C$ interface or other implemented host interface, if so directed.

In some embodiments, the control module 105 may include one or more default configurations that direct the control module to perform the various logging functions previously described without the need for host 111 input. In such embodiments, the default configurations may be determined at the time of transceiver 100 manufacture. Microcode may be executed by control module 105 that causes the logging operations as specified by the default configurations. A user may also direct host 111 to change the default configurations if desired.

The principles of the present invention provide for an optical transceiver with many benefits over current transceivers. Specifically, the present invention allows for direct user control of the logging process. For example, a user has the ability to select which transceiver parameters to measure based on the microcode that the logger executes, and where to store the information to be logged. This gives the user flexibility in handling the logged information. Because of this, the user also has the ability to easily evaluate the logged data. In some embodiments, remote control of the logging process and remote evaluation of the logged information are possible using the internet or other wide area network. In another embodiment, the user may direct that some of the logged information be stored in both the host memory and the transceiver persistent memory. This creates a redundant backup that ensures the stored data is protected should there be a failure in either of the memories.

Additionally, the present invention allows a user to specify one or more actions to perform when information is logged. For example, in one embodiment the user can direct that when certain information is logged, the control module perform a self-test diagnostic routine specific to the type of information that is logged. This allows for easier determination of errors and their underlying causes. In another embodiment, the user can direct that off-transceiver microcode paging be performed. In this manner, only microcode that is more likely to be used is loaded into the transceiver system memory. This allows for a small amount of transceiver system memory to implement a large number of microcode segments. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In an optical transceiver that is communicatively coupled to a host computing system, the optical transceiver including a system memory and at least one processor, a method for the optical transceiver to log information regarding its operational circumstances, the method comprising:

an act of executing microcode from the system memory, wherein the microcode is structured such that when executed by the at least one processor, causes the optical transceiver to log information regarding its operational circumstances based on one of input from the host computing system or default configurations, wherein the input from the host computing system comprises a logging type identification of which optical transceiver information is to be logged, and wherein the act of executing the microcode causes the optical transceiver to perform the following:

an act of identifying operational information to be logged based on the logging type identification.

2. A method in accordance with claim 1, wherein the input from the host computing system comprises a log location identification of at least one storage location in which to store the information to be logged, and wherein the act of executing the microcode causes the optical transceiver to perform the following:

an act of storing the operational information to be logged in the at least one storage location as specified in the log location identification.

3. A method in accordance with claim 2, wherein the log location identification identifies an on-transceiver persistent memory.

4. A method in accordance with claim 2, wherein the log location identification identifies a memory of the host computing system.

5. A method in accordance with claim 2, wherein the log location identification identifies a remote evaluation center coupled to the host computing system using a network protocol.

6. A method in accordance with claim 1, wherein the logging type identification identifies one or more of a total operation time for the optical transceiver, a number of times the optical transceiver has been booted, an average operational time between boots, a total number of error conditions encountered, an identification of one or more error conditions encountered, a categorization of the number of error conditions encountered for a plurality of different error types, a laser wavelength approximation, a laser temperature measurement, a supply voltage measurement, a transceiver temperature measurement, a laser bias current measurement, a TEC current measurement, a transmit power measurement, a receive power measurement, and an acceleration measurement.

7. In an optical transceiver that is communicatively coupled to a host computing system, the optical transceiver including a system memory and at least one processor, a method for the optical transceiver to log information regarding its operational circumstances, the method comprising:

an act of executing microcode from the system memory, wherein the microcode is structured such that when executed by the at least one processor, causes the optical transceiver to log information regarding its operational circumstances based on one of input from the host computing system or default configurations, wherein the input from the host computing system comprises an action identification of at least one action to be performed when the information is logged, wherein the microcode is structured such that when executed by the at least one processor, the microcode causes the optical transceiver to perform the at least one action specified in the action identification when logging the operation information to be logged.

8. A method in accordance with claim 7, wherein the action identification identifies an optical transceiver self-diagnostic test.

9. A method in accordance with claim 7, wherein the action identification identifies a microcode segment paging operation.

10. An optical transceiver comprising the following:

at least one processor; and a system memory configurable to contain microcode;

wherein the at least one processor is configured to execute the microcode in the system memory, the microcode configured such that when executed to cause the optical transceiver to log information regarding its operational circumstances based on one of input from a host computing system coupled to the optical transceiver circumstances or default configurations, wherein the input from the host computing system comprises a logging type identification of which optical transceiver information is to be logged, and wherein the microcode is structured when executed by the at least one processor to cause the optical transceiver to identify operational information to be logged based on the logging type identification.

11. An optical transceiver in accordance with claim 10, wherein the input from the host computing system comprises a log location identification of at least one storage location in which to store the information to be logged; and wherein the microcode is structured when executed by the at least one processor to cause the optical transceiver to store the operational information to be logged in the at least one storage location as specified in the log location identification.

12. An optical transceiver in accordance with claim 11, wherein the log location identification identifies one or more of an on-transceiver persistent memory, a memory of the host computing system, or a remote evaluation center coupled to the host computing system using a network protocol.

13. An optical transceiver in accordance with claim 10, wherein the input from the host computing system comprises an action identification of at least one action to be performed when the information is logged, and wherein the microcode is structured when executed by the at least one processor to cause the optical transceiver to perform the at least one action specified in the action identification when logging the operation information to be logged.

14. An optical transceiver in accordance with claim 13, wherein the action identification identifies one or more of an optical transceiver self-diagnostic test and microcode segment paging.

15. An optical transceiver in accordance with claim 10, wherein the logging type identification identifies one or more of a total operation time for the optical transceiver, a number of times the optical transceiver has been booted, an average operational time between boots, a total number of error conditions encountered, an identification of one or more error conditions encountered, a categorization of the number of error conditions encountered for a plurality of different error types, a laser wavelength approximation, a laser temperature measurement, a supply voltage measurement, a transceiver temperature measurement, a laser bias current measurement, a TEC current measurement, a transmit power measurement, a receive power measurement, and an acceleration measurement.

16. An optical transceiver in accordance with claim 10, wherein the optical transceiver is one of a 1 G laser transceiver, a 2 G laser transceiver, a 4 G laser transceiver, a 8 G laser transceiver, or a 10 G laser transceiver.

17. An optical transceiver in accordance with claim 10, wherein the optical transceiver is a laser transceiver suitable for fiber optic links greater than 10 G.

18. An optical transceiver in accordance with claim 10, wherein the optical transceiver is one of a XFP laser transceiver, a SFP laser transceiver, or a SFF laser transceiver.

* * * * *

UNITED STATES PATENT AND TRADEMARK OFFICE
CERTIFICATE OF CORRECTION

PATENT NO. : 7,653,314 B2 Page 1 of 1
APPLICATION NO. : 11/468246
DATED : January 26, 2010
INVENTOR(S) : Dybsetter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Twenty-third Day of November, 2010

David J. Kappos
*Director of the United States Patent and Trademark Office*